United States Patent
Motta

(10) Patent No.: US 9,389,678 B2
(45) Date of Patent: Jul. 12, 2016

(54) VIRTUAL IMAGE SIGNAL PROCESSOR

(71) Applicant: NVIDIA Corporation, Santa Clara, CA (US)

(72) Inventor: Ricardo J. Motta, Plao Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 211 days.

(21) Appl. No.: 13/875,217

(22) Filed: May 1, 2013

(65) Prior Publication Data

US 2013/0307999 A1 Nov. 21, 2013

Related U.S. Application Data

(60) Provisional application No. 61/647,433, filed on May 15, 2012.

(51) Int. Cl.
*H04N 5/232* (2006.01)
*G06F 3/00* (2006.01)

(52) U.S. Cl.
CPC ............ *G06F 3/005* (2013.01); *H04N 5/23203* (2013.01)

(58) Field of Classification Search
CPC ........................... G06F 3/005; H04N 5/23203
See application file for complete search history.

(56) References Cited

U.S. PATENT DOCUMENTS

| | | | | |
|---|---|---|---|---|
| 6,052,509 | A * | 4/2000 | Abe | 386/230 |
| 6,535,243 | B1 * | 3/2003 | Tullis | 348/207.1 |
| 8,237,801 | B2 * | 8/2012 | Levien et al. | 348/207.1 |
| 8,471,924 | B2 * | 6/2013 | Nagoya | 348/223.1 |
| 2009/0263012 | A1 | 10/2009 | Georgis et al. | |
| 2011/0242370 | A1 * | 10/2011 | Endo | 348/241 |

FOREIGN PATENT DOCUMENTS

CN 101582963 11/2009

* cited by examiner

*Primary Examiner* — Gary C Vieaux

(57) ABSTRACT

The disclosure provides a digital camera. The digital camera includes an image sensor configured to produce image sensor data. The digital camera further includes (i) an image signal processor configured to receive and perform a plurality of on-camera processing operations on the image sensor data, where such processing operations yield a plurality of intermediate processed versions of the image sensor data, and (ii) a communication module configured to wirelessly transmit, to an off-camera image signal processor, image source data which includes at least one of: (a) the image sensor data and (b) one of the intermediate processed versions of the image sensor data, where such transmission is performed automatically in response to the producing the image sensor data.

21 Claims, 5 Drawing Sheets

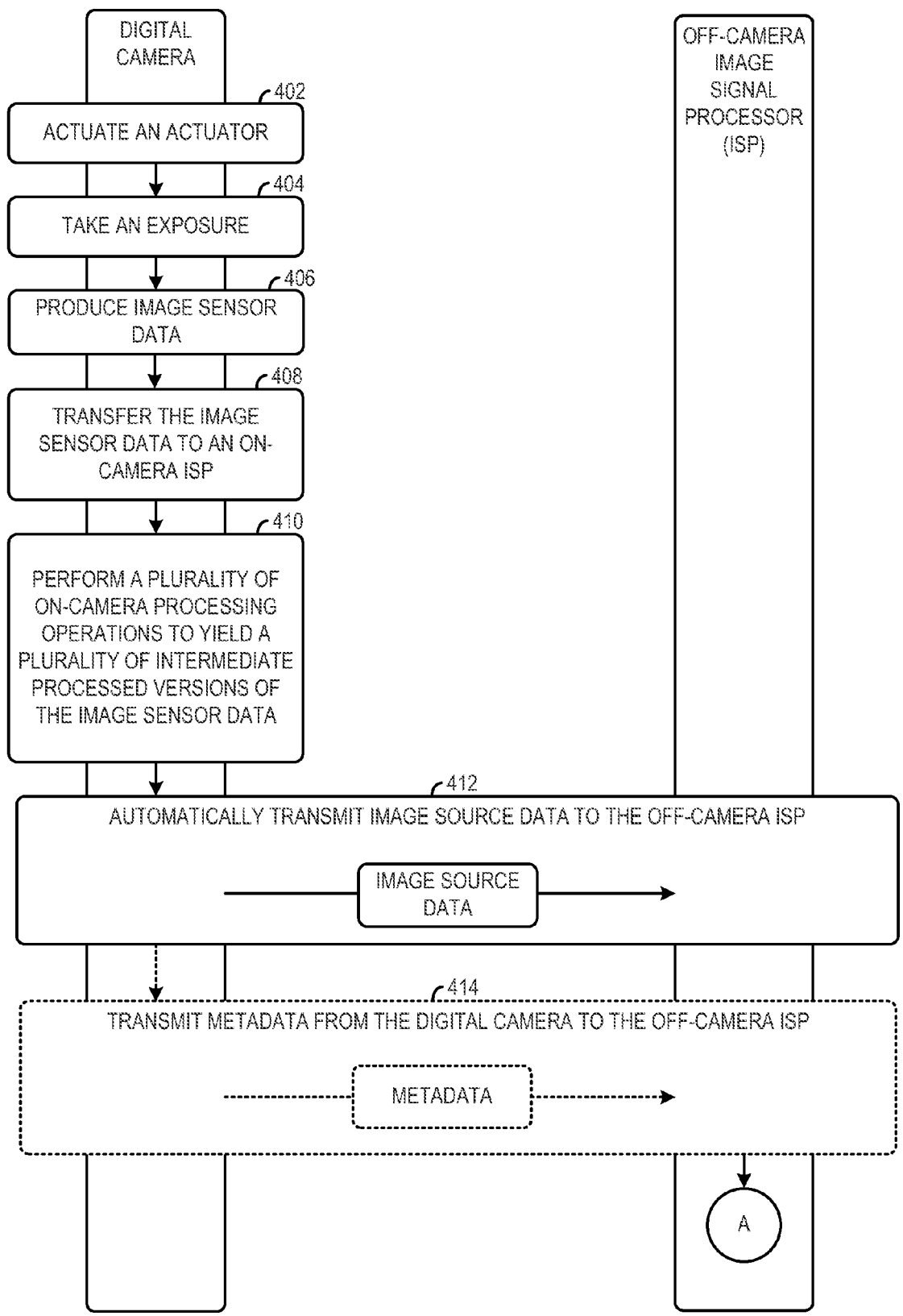

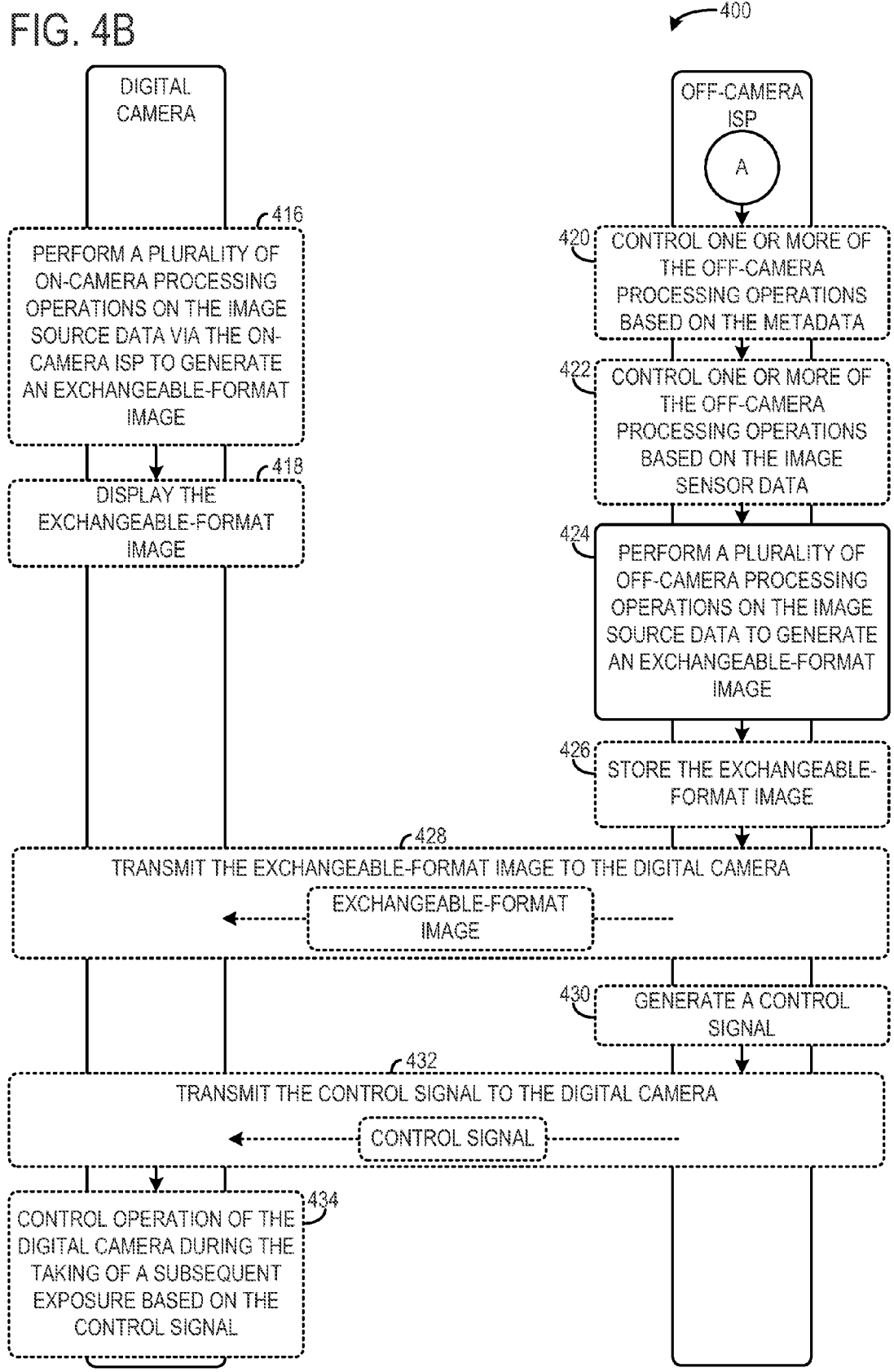

VIRTUAL IMAGE SIGNAL PROCESSOR

CROSS REFERENCE TO RELATED APPLICATION

The present application claims the benefit of and priority to U.S. Provisional Patent Application No. 61/647,433, filed May 15, 2012, the entire contents of which is incorporated herein by reference for all purposes.

BACKGROUND

Digital cameras use various image sensors (CCD, CMOS, etc.) to convert light received through optical components (e.g., lenses) into electronic signals. The electronic signals are then sent through on-camera processing pipelines to ultimately generate exchangeable-format images stored on the camera. The images may be displayed on the camera's display screen, and the images may be manually transferred to another device such as a desktop, laptop, tablet or other computing device. The exchangeable-format images are in a device-independent format that may be shared between computing devices, such as JPEG, GIF, etc. The processing pipeline includes an image signal processor (ISP) implemented primarily in hardware within the camera. The dedicated hardware implementation is due to the high computational intensity of the processing operations in the ISP, and enables high quality exchangeable-format images to be generated relatively quickly. The on-camera processing operations may include range correction, defective pixel correction (DPC), lens shading correction, demosaicing, etc.

The inventor has recognized several drawbacks with the typical on-board ISP, discussed above. For instance, implementing the ISP via hardware components decreases the ISP's adaptability and inhibits performance upgrades and processing operation improvements. Additionally, it may take a considerable amount of time to develop improved hardware for on-board ISPs, lengthening the duration for iterative improvement and increasing the time it takes new innovations to reach the market. Moreover, it may be desirable to display an image on the camera with a small amount of lag after an exposure is taken and with a small amount of power expense. On the other hand, it also may be desirable to generate a high quality image, which can increase the complexity of the onboard systems and consume more power. The aforementioned goals (i.e., lag, power expense, and image quality) are usually at odds. Thus, generating images via an on-camera ISP may involve trade-offs between lag, power expense, and image quality.

BRIEF DESCRIPTION OF THE DRAWINGS

FIGS. 4A-4B show a method for image processing in a digital photography system.

DETAILED DESCRIPTION

A digital photography system for automatically transferring camera-specific image source data to an off-camera image signal processor (ISP) for processing is described herein. Off-loading processing to a remote resource provides greater flexibility in the ISP and enables the harnessing of a greater amount of computational power for image processing. As a result, the image quality of the processed images is increased when an off-camera ISP is utilized as compared to the image quality that can be obtained via the on-camera ISP. Furthermore, when an off-camera ISP is used, the processing operations may be updated, adjusted based on data (e.g., metadata) received from the camera, from the factory, and/or adjusted based on a user's predilection to further enhance image quality. Additionally, the off-camera ISP may generate and send in-bound control signals to the digital camera to improve image quality and overall camera performance.

Figure 1:
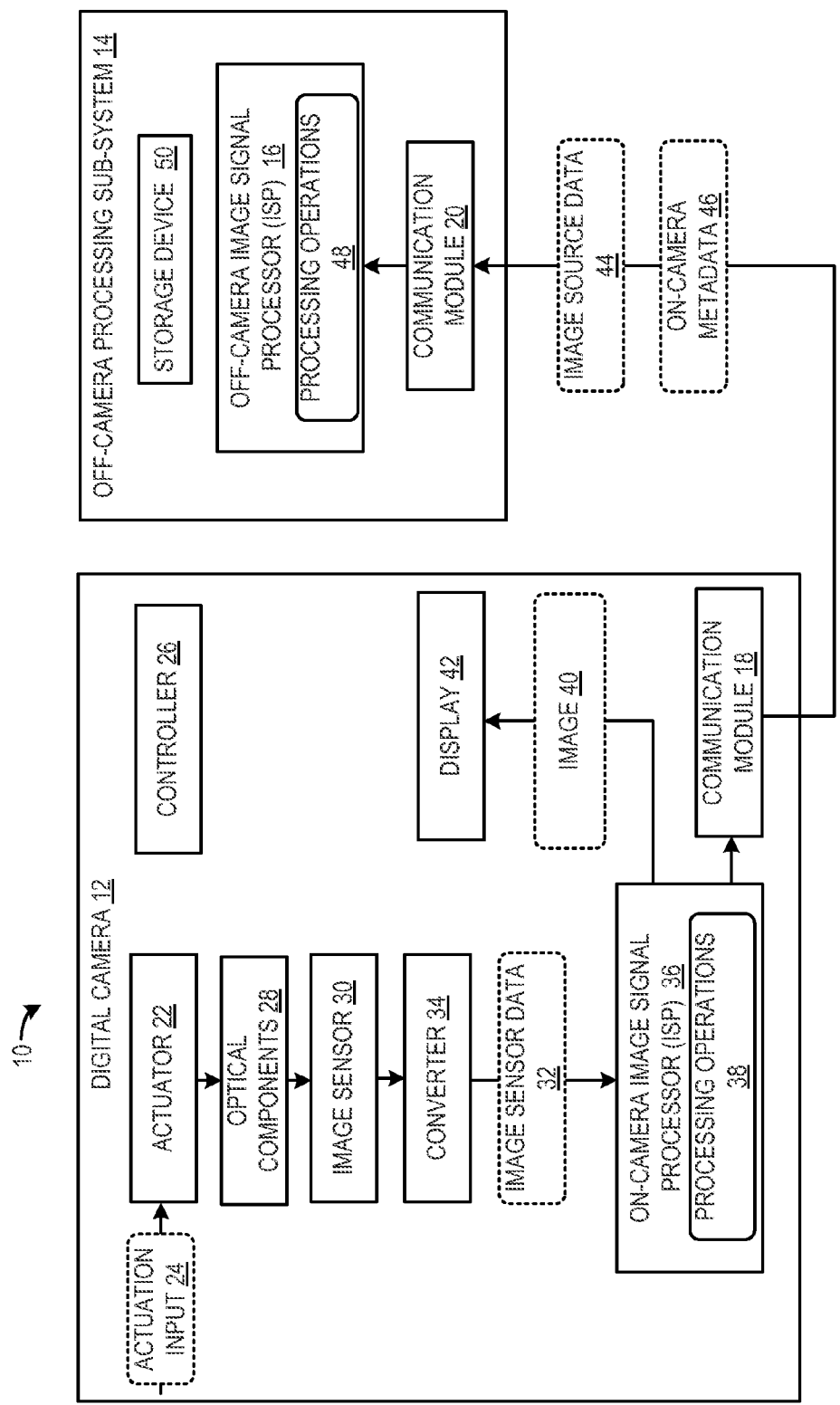
FIGS. 1 and 2 show schematic depictions of a digital photography system.
Figure 2:
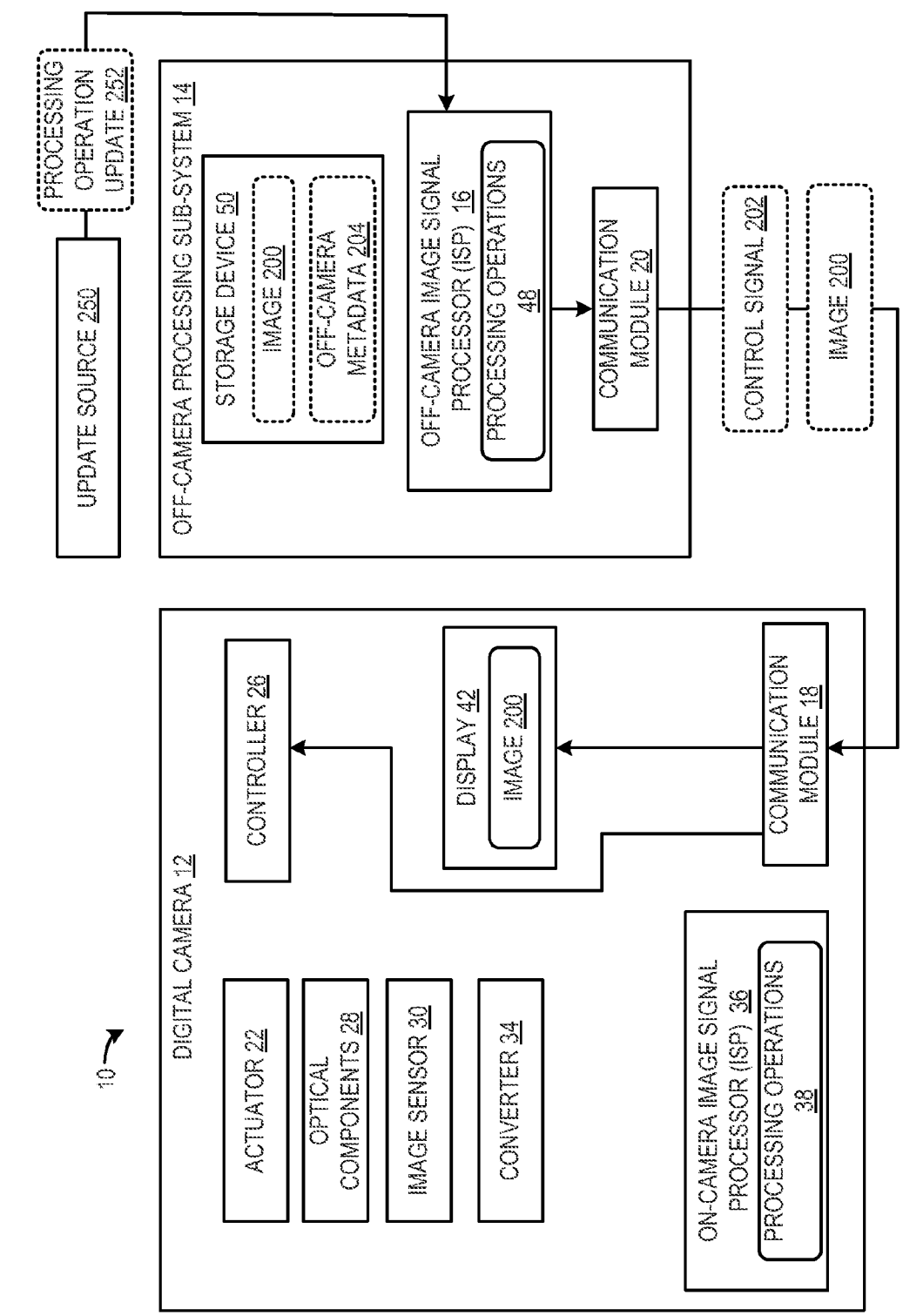
Figure 3:
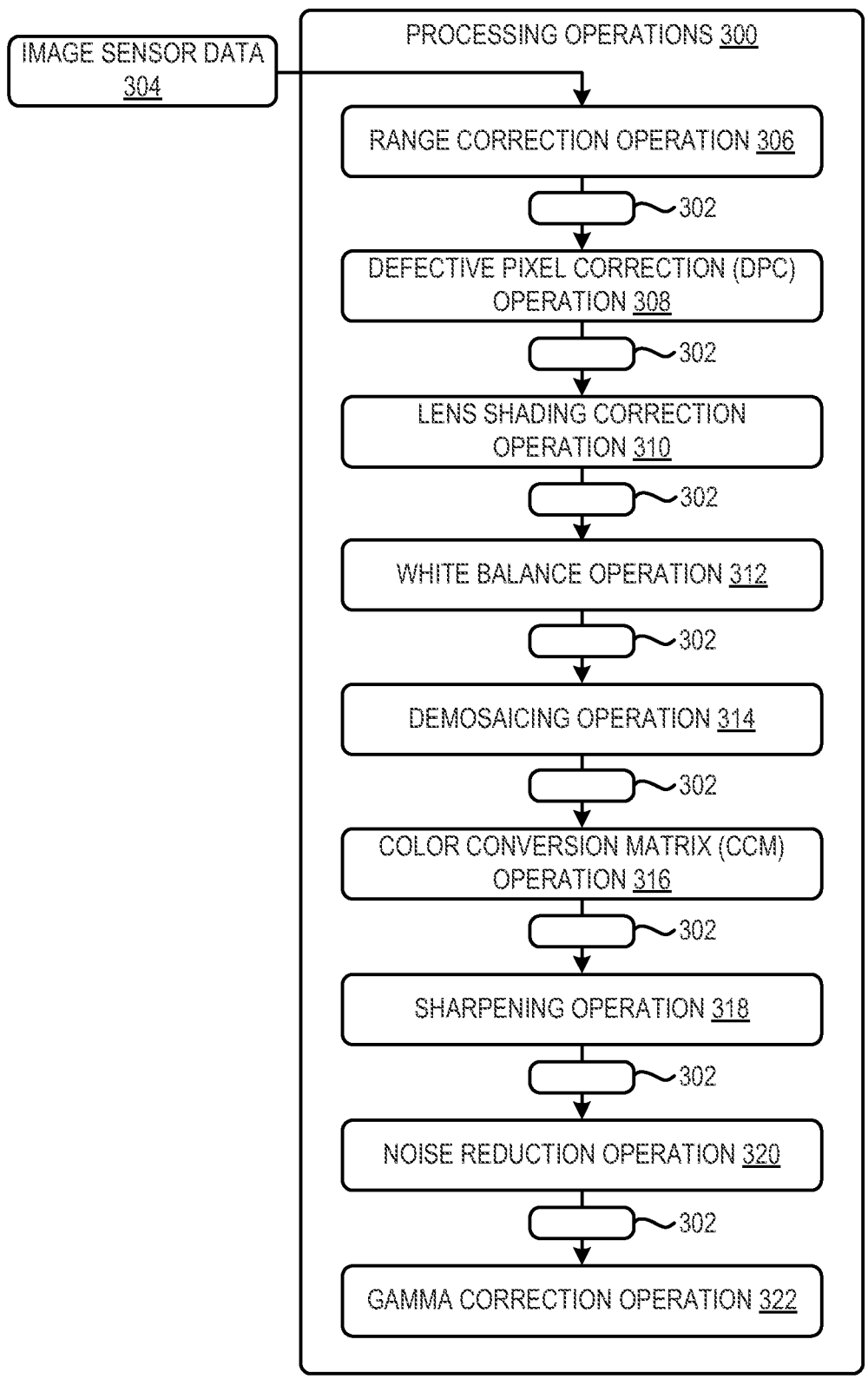
FIG. 3 shows an example of a processing operation pipeline included in the digital photography system shown in FIGS. 1 and 2.

FIGS. 1 and 2 are schematic depictions showing aspects of a digital photography system that employs automated remote ISP processing. FIG. 3 shows a plurality of processing operations that may be executed by both an on-camera ISP and an off-camera ISP included in the digital photography system shown in FIGS. 1 and 2. FIGS. 4A-4B show a method for image processing in a digital photography system.

FIG. 1 depicts a digital photography system 10 configured to generate digital images from exposures taken through a digital camera 12, among other things. The digital photography system 10 includes the digital camera 12 in electronic communication with an off-camera processing sub-system 14 including an off-camera ISP 16. It will be appreciated that the digital camera 12 may be remotely located from the off-camera processing sub-system 14, in some embodiments. A network, such as the Internet, may facilitate electronic communication between the digital camera 12 and the off-camera processing sub-system 14. In this way, the off-camera ISP 16 may be accessed through a cloud computing platform, increasing the ISP's accessibility. Therefore, the off-camera ISP 16 may be accessed via the digital camera at any location where the digital camera 12 has connectivity to the Internet.

A communication module 18, included in the digital camera 12, is configured to provide wireless connectivity to the off-camera processing sub-system 14 and specifically the off-camera ISP 16. It will be appreciated that the wireless connectivity may be achieved through one or more suitable communication platforms such as a mobile communication network (e.g., 3G, 4G, etc.), Bluetooth, Wi-Fi, etc. Further in some examples, the communication module 18 may include an application programming interface (API). The off-camera processing sub-system 14 may also include a communication module 20 to enable the electronic communication. However, in other embodiments the electronic communication functionality of the off-camera processing sub-system 14 may be integrated into the off-camera ISP 16.

The digital camera 12 may also include an actuator 22. Exemplary actuators include a shutter button, a touch interface, an electronic switch, a motion sensor, a timer, a communication signal, etc. The actuator 22 may be actuated via an actuation input 24, causing the digital camera 12 to take at least one exposure or another suitable image capture operation. In one example, the actuator may cause the camera to take a plurality of exposures. Further in another example, the exposures may be frames in a video sequence. The actuation input 24 may be a user input and/or may be an input signal from a controller 26 included in the digital camera 12. Thus, the actuation input may be manual or automatic. When an exposure is take light passes through one or more optical components 28 and is directed to an image sensor 30. The optical components 28 may include lenses, filters, mirrors, etc. It will be appreciated that the digital camera may include a plurality of image sensors, in other embodiments.

The image sensor 30 generates image sensor data 32 in response to receiving the light projected through the optical components. The image sensor data may include data corresponding to one or more exposures and/or a video sequence which may include a plurality of frames. The image sensor data 32 may be RAW data. In the depicted embodiment, the image sensor data 32 is sent through an analog to digital convertor 34 converting analog data from the image sensor into digital data. However, in other embodiments the output of the image sensor may be digital or the converter may be integrated into the image sensor 30. Instead of the signals directly off of the sensor being the RAW format data, RAW format data may result from some relatively minimal amount of on-camera processing operations. In any case, RAW data is device-dependent and is not in a exchangeable-format that can be shared among and viewed on a range of different devices.

Continuing with the figure, the image sensor data 32 is transferred to an on-camera ISP 36. The on-camera ISP 36 is configured to execute a plurality of processing operations 38 on the image sensor data 32. The processing operations may be sequentially executed and each of the processing operations may yield an intermediate processed version. The intermediate processed versions are device dependent and may not be in an exchangeable-format. In one example, the device dependent intermediate processed versions may be exchanged in the system in a proprietary format. Moreover, the intermediate processed versions are distinct from any exchangeable-format image type which enables cross-platform viewing of an image associated with the exposure. Exchangeable-formats may include JPEG, GIF, etc.

The on-camera ISP 36 is also configured to execute the plurality of the processing operations 38 that culminate in an image 40 (e.g., exchangeable image). The image 40 is sent to a display 42 in the digital camera 12 for display. In this way, a user may preview an image with the on-board display after an exposure is taken.

The communication module 18 is further configured to send image source data 44, received from the on-camera ISP 36 and/or the image sensor 30, to the off-camera ISP 16. The image source data 44 may include at least one of the image sensor data 32 and one of the intermediate processed versions in the processing pipeline in which processing operations might be sequentially executed. The processing operations are discussed in greater detail herein with regard to FIG. 3. The image source data 44 is device dependent. That is to say that, the image source data 44 may not be exchangeable with other computing devices, digital cameras, etc., configured to view exchangeable-format images such as JPEGs, GIFs, etc. Additionally, the image source data 44 may be compressed via the on-camera ISP 36 prior to the transfer. Therefore, the off-camera ISP 16 may also be functionally configured to decompress the image source data 44. Compressing the image source data may decrease the amount of time it takes to transfer of the image source data to the off-camera ISP from the digital camera.

Additionally, the communication module 18 is configured to send on-camera metadata 46 to the off-camera ISP 16. It will be appreciated that in other embodiments the metadata 46 may be combined with the image source data 44 and concurrently transmitted to the off-camera ISP. The on-camera metadata 46 may include at least one of calibration data, identification data (e.g., hardware specification data, factory information data), and local setting data corresponding to the digital camera. For instance, the identification data may include identification numbers and/or text associated with the model of the camera, hardware in the camera such as the image sensor, and/or optical components in the camera. The identification data may further include tags (e.g., descriptive keywords) associated with the exposure. The local setting data may include shutter speed, ISO setting data, sensor gain data, on-camera processing operation data (e.g., processing operations performed on-board the camera, the order of the processing operations performed on-board the camera, etc.), defective pixel data, lens shading data, lens focus data, and/or lens aperture. The calibration data may include defective pixel lists, dark signal data, the lens shading correction function, and spectral sensitivity characteristics. In this way, the camera specific hardware and settings may be identified for use in off-camera image processing. In one example, a camera-specific identification number and/or image sensor identification number may be included in the metadata which enables the off-camera ISP 16 to adjust image processing based on the identification numbers.

The off-camera ISP 16 is configured to execute a plurality of processing operations 48. The off-camera processing operations may be implemented in hardware and/or software. In some examples, at least a portion of the processing operations 48 are executed via software modules in a computing device (e.g., a remote server). Therefore, in some examples a least a portion of the off-camera ISP may be stored in memory as instruction code executable by a processor. In this way, the processing operations may be virtualized, thereby increasing the flexibility and adaptability of the off-camera processing operations. As a result, the off-camera processing operations may be updated and/or adjusted based on data from the digital camera, a user's preferences, camera manufacturer updates, etc., to increase the image quality of an image generated off-camera and/or provide greater processing customization, if desired. Additionally, the off-camera ISP 16 may have greater processing power than the on-camera ISP 36, enabling additional image quality enhancement of the image, if desired. The off-camera processing sub-system 14 may also include a storage device 50 for storing any of the data received by the off-camera processing sub-system described above. In the event that off-camera changes are implemented as hardware modifications/upgrades, the benefit of these changes can be obtained without any changes to the local hardware (e.g., digital camera 10).

FIG. 2 shows the digital photography system 10 after the image source data 44 and the metadata 46, shown in FIG. 1, are received by the off-camera ISP 16. The off-camera ISP 16 is configured to perform at least a portion of the processing operations 48 on the image source data. The image processing operations are further specified in FIG. 3.

In some examples, the processing operations are controlled or adjusted based on the metadata 46, shown in FIG. 1. For instance, an image sensor identification number may be included in the metadata. In such an example, the processing operations may be adjusted based on image sensor data associated with the identified image sensor stored in the off-camera processing sub-system 14 (e.g., adjusted for a particular sensor type, or a sensor from a particular manufacturer). Therefore, the off-camera processing sub-system 14 may have off-camera metadata 204 stored therein (e.g., cloud-stored data) and associated with specific image sensors, digital cameras, etc. The off-camera metadata may be provided by camera suppliers and component (e.g., sensor) manufacturers or acquired during calibration at the factory. In this way, the processing operations may be tuned based on the model of the camera, the type of image sensor, etc., thereby increasing the adaptability of the off-camera ISP 16. Moreover, the offline processing can be adjusted based on choices made at the camera. For example, based on the exposure metering reported by the camera, or user choice, a more detailed and lengthier reconstruction might be automatically selected, which would direct the image towards a specific set of servers and resources capable of performing such operation.

Further in one example, the processing operations may be controlled or adjusted based on the image source data 44. For instance, an intermediate processed version included in the image source data may trigger the processing operations in the pipeline following the processing operation preceding the intermediate processed version executed via the on-camera ISP 36 to be executed. Further in another example, if only the image sensor data 32, shown in FIG. 1, is sent to the off-camera ISP 16 all of the processing operations 48 may be selected for execution.

Further in some examples, the off-camera ISP may receive off-camera metadata from external sources. For instance, the off-camera metadata may be crowd sourced. Specifically, in one example the user might want the image content to be recognized, in which case the images may be directed to offline resources capable of pattern recognition using, computer vision for instance, or a crowd sourcing service manned by real people that look at the picture and type a description.

The processing operations 48 executed on the image signal data via the off-camera ISP 16 may generate an exchangeable image 200. As shown, the image 200 may be stored in the storage device 50 included on the off-camera processing subsystem. The image may be accessed by a user at some later time via the digital camera, a desktop computer, a laptop computer, a tablet, etc.

Additionally, the image 200 may also be transmitted to the digital camera 12 and specifically the communication module 18. In one example, the image 200 may be a file. However, in other examples the image data is organized in another suitable manner. Thus, the communication module 18 is configured to receive the image 200. Subsequently, the image 200 may be displayed and/or stored on-board the digital camera.

The off-camera ISP 16 may also be configured to generate and send a control signal 202 to the communication module 18 in the digital camera 12. Therefore, the communication module 18 may be configured to receive the inbound control signal 202.

In one example, the control signal 202 may be generated based on the image source data 44 and/or the metadata 46, shown in FIG. 1. For instance, the image source data and/or metadata may be analyzed to determine if the setting of the digital camera may be adjusted to improve image quality. If it is determined that that adjustment of camera setting would improve image quality a control signal may be generated.

The controller 26 may be operative to use the inbound control signal 202 to control operation of the digital camera for a subsequent exposure. Controlling operation of the digital camera may include adjusting at least one of a focus setting, an exposure control setting, a sensor gain setting, a white balance setting, and a flash control setting for the subsequent exposure. It will be appreciated that the control signal may be configured to alter any non-reversible process or setting within the digital camera.

Additionally, an update source 250, such as the camera manufacturer, image sensor manufacturer, etc., may provide a processing operation update 252 to the off-camera ISP 16. The processing operation update 252 may be configured to alter one or more of the off-camera processing operations 48. In this way, the off-camera processing operations may be periodically updated to iteratively improve the processing operations. The update source 250, or other suitable external source, may also provide metadata to the off-camera ISP, in some examples.

FIG. 3 shows an illustration of a plurality of processing operations 300 that may be executed by the on-camera ISP 36 and/or the off-camera ISP 16. As discussed above, each of the processing operations may render an intermediate processed version 302 of the image sensor data received by the ISP. The processing operations 300 may be sequentially executed in the order depicted. However, other sequential arrangements of the processing operations have been contemplated. Further in other embodiments, only a portion of the processing operations may be executed by one or both of the ISPs. Additionally, two or more of the processing operations may be combined (e.g., algorithmically combined) to form a single processing operation. In this way, processing efficiency in the ISPs may be increased. Thus, the operations may be executed in a processing pipeline. The processing pipeline may be conceptually divided into a front-end and a back-end. The front-end of the pipeline is shown in FIG. 3. The front end processing operations may be configured to create an exchangeable image that is defined in objective terms. The back-end of the pipeline may be configured to encode, compress, render, and/or color change the processed data to generate an image in an exchangeable format such as GIF, JPEG, etc. It will be appreciated that the aforementioned processing operations may also be included in the on-camera ISP and the off-camera ISP, in some embodiments.

As discussed above with regard to FIGS. 1 and 2, both the on-camera and off-camera ISPs (36 and 16, respectively) may receive image sensor data. The off-camera ISP may also receive an intermediate processed version of the image sensor data. Specifically in the embodiment depicted in FIG. 3 the image sensor data 304 is sent to a range correction operation 306 included in the processing operations 300. The range correction operation 306 is performed on the image sensor data 304. The range correction operation may adjust numerical ranges in the image sensor data to desired values and produce an intermediate processed version of the image sensor data. It will be appreciated that each of the intermediate processed versions 302 produced after each operation may be dissimilar to one another. Moreover, the intermediate processed versions may be dissimilar to the exchangeable image 200, shown in FIG. 2. Furthermore, the intermediate processed versions may be distinct from any exchangeable-format image type which enables cross-platform viewing of an image associated with the exposure. It will be appreciated that at least a portion of the operations shown in FIG. 3 may not be sequentially executed in the order depicted, in other embodiments. Further in some embodiments, at least a portion of the operations may be executed at overlapping time intervals.

Next, a defective pixel correction (DPC) operation 308 is performed on an intermediate processed version of the image sensor data and another intermediate processed version of the data is produced. The DPC operation 308 may identify defective pixels in the image sensor 30, shown in FIGS. 1 and 2, and alter the image sensor data to correct for the defective pixels. Additionally in one embodiment, the DPC operation 308 may also include cross-talk correction and/or non-linearity correction. The DPC operation may be referred to as a sensor interface block. The DPC operation 308 shown in FIG. 3 may produce another intermediate processed version.

Continuing with FIG. 3, a lens shading correction operation 310 is performed on an intermediate processed version of the image sensor data and another intermediate processed version of the image sensor data is produced. The lens shading correction operation may correct for variations in the amount of light traveling through lenses in the camera. Additionally, circuits, glass plates, plastic plates, etc., may be in front of the image sensor. Therefore, the lens shading correction may also correct for shading of the circuits in the camera obstructing the lenses or other optical components. Specifically, an algorithm in the operation may fit the surface of a lens to the values of the pixels. A Bessel interpolator may be used to implement this functionality. In one embodiment, the Bessel interpolator may be executed in real time.

Next, a white balance operation 312 is performed on the intermediate processed version of the image sensor data and another intermediate processed version of the image sensor data is generated through execution of the operation. The white balance operation 312 may be configured to normalize red, blue, and green (RGB) values in the data. For instance, the image sensor 30 may have unequal RGB values for a white object which may be caused by the transmittance of the filter and/or the color of the light. The white balance operation may also include a gain operation which may be configured to adjust camera's sensitivity to light.

Next, a demosaicing operation 314 is performed on an intermediate processed version of the image sensor data and another intermediate processed version of the image sensor data is generated through execution of the operation. The demosaicing operation may be configured to interpolate a set of RGB values for each point in the image sensor data. Thus, the demosaicing operation may alter the data based on human luminescence perception. In one example, the demosaicing operation may be interpolated based on a Bayer pattern. Further in some examples, the interpolation may be implemented through convolution or direct calculation.

Next, a color conversion matrix (CCM) operation 316 is performed on an intermediate processed version of the image sensor data and another intermediate processed version of the image sensor data is generated through execution of the operation. The CCM operation 316 may be configured to correct for the variation in camera filters. For instance, the characteristics of camera filters may differ between manufacturer, production run, etc. Additionally, a filter standard may be used for certain objects. Therefore, a 3 by 3 transform may be used to generate predictable RGB values in the CCM operation, in some embodiments.

Next, a sharpening operation 320 is performed on an intermediate processed version of the image sensor data and another intermediate processed version of the image sensor data is generated through execution of the operation. The sharpening operation may be used to sharpen and/or blur various aspects of the image data.

Next, a noise reduction operation 322 is performed on an intermediate processed version of the image sensor data and another intermediate processed version of the image sensor data is generated through execution of the operation. The noise reduction operation may be configured to remove artifacts from the data to decrease noise in the data to improve image quality.

Next, a gamma correction operation 324 is performed on an intermediate processed version of the image sensor data. The gamma correction operation 324 may be configured to apply a logarithmic function to the image sensor data, to encode luminance based on human perception of luminance to decrease the overall size of the image data by improving how the existing bits are allocated to perceptually distinct light levels. In either the on-camera ISP and/or off-camera ISP, after the gamma correction operation is implemented the data may be encoded in an exchangeable-format and/or compressed to generate an exchangeable-format image.

FIGS. 4A and 4B show a method 400 for image processing in a digital photography system. As shown, the method is implemented via a digital camera and an off-camera ISP. The digital camera and off-camera ISP shown in method 400 may be similar to the digital camera 12 and off-camera ISP 16 included in the digital photography system 10, discussed above with regard to FIGS. 1-3, in some embodiments. In other embodiments, the digital camera and off-camera ISP may be included in another suitable digital photography system.

The method includes at 402, shown in FIG. 4A, actuating an actuator. Next at 404 the method includes taking an exposure in response to actuating the actuator. Taking an exposure may comprise permitting light to travel through a plurality of optical components (e.g., lenses, filters, etc.) to an image sensor.

Next at 406 the method includes producing image sensor data in response to taking the exposure. It will be appreciated that step 406 may be carried out by an image sensor. At 408 the method includes transferring the image sensor data to an on-camera ISP. Further in some examples, the image sensor data may be converted from analog to digital data prior to step 408.

At 410 the method includes performing a plurality of on-camera processing operations to yield a plurality of intermediate processed versions of the image sensor data. As discussed above the intermediate processed versions are distinct from any exchangeable-format image type which enables cross-platform viewing of an image associated with the exposure. As shown, steps 402-410 are implemented at the digital camera.

At 412 the method includes automatically transmitting image source data to the off-camera image signal processor (ISP) in response to taking the exposure and/or producing the image sensor data. Automatically transmitting image source data to the off-camera may include sending the image source data to the off-camera ISP from the digital camera and receiving the image source data at the off-camera ISP from the digital camera.

Next at 414 the method may include transmitting metadata from the digital camera to the off-camera ISP. It will be appreciated that step 414 may be automatically implemented in response to taking the exposure and/or producing the image sensor data. Wirelessly transmitting the off-camera ISP to the metadata to the off-camera ISP may include sending metadata from the digital camera to the off-camera ISP and receiving the metadata at the off-camera ISP from the digital camera.

At 416, illustrated in FIG. 4B, the method may include performing a plurality of on-camera processing operations on the image source data via the on-camera ISP to generate an exchangeable-format image. In this way, a preview image may be generated for display on the camera. Next at 418 the method includes displaying the exchangeable-format image. Steps 416-418 are implemented via the digital camera.

At 420 the method may include controlling one or more of the off-camera processing operations based on metadata. In this way, the off-camera processing operations may be selected and/or adjusted based on the specific characteristics of the digital camera, such as the type of image sensor in the digital camera, the type of optical componentry in the digital camera, defective pixels within the image sensor in the digital camera, setting data (e.g., shutter speed, flash setting, gain settings, and/or focus settings) in the digital camera. The gain setting (e.g., ISO setting) may include the sensor gain applied to data from the sensor, thereby adjusting the sensor's sensitivity to light.

Next at 422 the method may include controlling one or more of the off-camera processing operations based on the image sensor data. For instance, the off-camera processing operations selectively applied to the image source data may be chosen based on the intermediate processed version of the image sensor data transmitted to the off-camera ISP. Specifically in one embodiment, the processing operations sequentially following an intermediate processed version included in the image source data sent to the off-camera ISP may be selected for execution by the off-camera ISP.

Next at 424 the method includes performing a plurality of off-camera processing operations on the image source data to generate an exchangeable image. In some examples, the exchangeable image may be in a proprietary format. However in other examples, the exchangeable image may be in a standard format. It will be appreciated that the image may be of a higher quality than the image generated on-board the camera due to the greater amount of processing power available in the off-camera ISP as well as the adaptability of the off-camera ISP. Thus, the strengths of cloud computing can be leveraged to provide a higher quality image to the user of a digital camera. Further in some embodiments, prior to performing the off-camera processing operations, the off-camera processing operations may be updated. For instance, the digital camera manufacturer may periodically update the off-camera processing algorithms to iteratively improve the processing operations.

Next at 426 the method may include storing the exchangeable image locally or in a remote server/resource. In this way, the image may be stored for remote viewing at some later time by the user. For instance, a user may access the image via a personal computer such as a desktop computer, laptop computer, and/or tablet. Steps 420-426 are implemented via the off-camera ISP.

Next at 428 the method may include transmitting an exchangeable-format image (e.g., exchangeable standard-format image) to the digital camera. It will be appreciated that step 428 may be implemented automatically in response to generating the exchangeable-format image. Subsequently, the image may be viewed by the user via an on-camera display. In some examples, if there is a high speed connection between the digital camera and the off-camera ISP the exchangeable-format image may be displayed on the digital camera as a preview image for the corresponding exposure and/or image sensor data.

At 430 the method may include generating a control signal. The control signal may be configured to control various aspects of the digital camera such as a focus setting, an exposure control setting (e.g., shutter speed and aperture), a sensor gain setting, a white balance setting, and/or a flash control setting for the subsequent exposure. It will be appreciated that the control signal may adjust any non-reversible process or setting in the digital camera. In this way, the off-camera ISP may adjust setting for subsequent exposures taken by the digital camera, enabling subsequent exposure setting to improve the quality of the images generated from successive exposures.

Next at 432 the method includes transmitting the control signal to the digital camera. At 434 the method includes controlling operation of the digital camera during the taking of a subsequent exposure based on the control signal. Step 434 may be implemented via a controller included in the digital camera. Furthermore, controlling operation of the digital camera may include adjusting one or more of an exposure control setting (e.g., shutter speed and aperture), a sensor gain setting, a white balance setting, a focus setting, and a flash control setting for the subsequent exposure. It will be appreciated that such interactive control between offline components and a camera can also be extended to a set of cameras. For example, after one camera on a specific location provides a valid light level reading, the same values can then be used by other cameras with enough temporal or spatial proximity.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware including the specific examples described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A digital camera, comprising:
   at least one image sensor configured to produce image sensor data;
   an image signal processor configured to receive and perform a plurality of on-camera processing operations on the image sensor data, wherein the on-camera processing operations yield a plurality of intermediate processed versions of the image sensor data that are distinct from any exchangeable-format image type which enables cross-platform viewing of an image associated with the image sensor data; and
   a communication module configured to wirelessly transmit, to an off-camera image signal processor, image source data comprising one of the intermediate processed versions of the image sensor data, wherein transmission of the image source data to the off-camera image signal processor is performed automatically in response to production of the image sensor data.

2. The digital camera of claim 1, wherein the on-camera processing operations are configured to yield an exchangeable-format image, further comprising a display configured to display the exchangeable-format image.

3. The digital camera of claim 1, wherein the communication module is configured to receive an exchangeable-format image from the off-camera image signal processor dissimilar in format to all of the plurality of the intermediate processed versions.

4. The digital camera of claim 1, wherein the communication module is operative to receive an inbound control signal from the off-camera image signal processor that is generated by the off-camera image signal processor based on the image source data, the digital camera further comprising a controller operative to use the inbound control signal to control operation of the digital camera for a subsequent exposure.

5. The digital camera of claim 4, wherein the controller is operative to use the inbound control signal to adjust at least one of a focus setting, an exposure control setting, a sensor gain setting, a white balance setting, and a flash control setting for the subsequent exposure.

6. The digital camera of claim 1, wherein the communication module is configured to wirelessly transmit metadata to the off-camera image signal processor.

7. The digital camera of claim 6, wherein the metadata comprises at least one of calibration data, identification data, and local setting data corresponding to the digital camera.

8. The digital camera of claim 6, wherein the communication module is configured to receive an inbound control signal from the off-camera image signal processor that is generated by the off-camera image signal processor based on the metadata, further comprising a controller configured to use the inbound control signal to control operation of the digital camera for a subsequent exposure.

9. The digital camera of claim 8, wherein the inbound signal generated by and received from the off-camera image signal processor is further based on the image source data, and wherein the subsequent exposure is controlled based on both the image source data and the metadata.

10. A digital photography system comprising: an off-camera image signal processor; and a digital camera comprising:
an image sensor configured to produce image sensor data in response to the digital camera taking an exposure;
an image signal processor configured to receive and perform a plurality of on-camera processing operations on the image sensor data, wherein the on-camera processing operations yield a plurality of intermediate processed versions of the image sensor data and an exchangeable-format image based on the image sensor data, the intermediate processed versions of the image sensor data being distinct from any exchangeable-format image type which enables cross-platform viewing of an image associated with the exposure;
a display configured to display the exchangeable-format image; and
a communication module configured to wirelessly transmit, to the off-camera image signal processor, image source data comprising one of the intermediate processed versions of the image sensor data, wherein transmission of the image source data to the off-camera image signal processor is performed automatically in response to the taking of the exposure.

11. The digital photography system of claim 10, wherein the off-camera image signal processor is configured to (i) perform a plurality of off-camera processing operations yielding an exchangeable-format image and (ii) send the exchangeable-format image to the digital camera.

12. The digital photography system of claim 11, wherein the off-camera image signal processor is configured to receive a processing operation update from an update source, the processing update altering one or more of the plurality of off-camera processing operations.

13. The digital photography system of claim 11, wherein the plurality of off-camera processing operations and the plurality of on-camera processing operations both comprise at least one of a range correction operation, a defective pixel correction operation, a lens shading correction operation, a white balance gain operation, a color conversion matrix correction operation, a sharpening operation, a noise reduction operation, and a gamma correction operation.

14. The digital photography system of claim 10, wherein the off-camera image signal processor is configured to associate off-camera metadata with the image source data.

15. The digital photography system of claim 10, wherein the communication module is further configured to wirelessly transmit on-camera metadata associated with the image source data to the off-camera image signal processor, the on-camera metadata comprising at least one of calibration data identification data, and Racal setting data corresponding to the digital camera.

16. The digital photography system of claim 15, wherein the off-camera image signal processor is configured to perform a plurality of off-camera processing operations on the image source data that are controlled at least in part based on the on-camera metadata.

17. A method for image processing in a digital photography system comprising:
at the digital camera, producing image sensor data via an image sensor;
transferring the image sensor data to an on-camera image signal processor;
performing a plurality of on-camera processing operations to yield a plurality of intermediate processed versions of the image sensor data, the intermediate processed versions being distinct from any exchangeable-format image type which enables cross-platform viewing of an image associated with the image sensor data;
in response to producing the image sensor data, automatically transmitting image source data to an off-camera image signal processor, the image source data comprising one of the intermediate processed versions of the image sensor data; and
at the off-camera image signal processor, performing a plurality of off-camera processing operations on the image source data to generate an exchangeable-format image.

18. The method of claim 17, further comprising: (i) transmitting metadata from the digital camera to the off-camera image signal processor; and (ii) at the off-camera image signal processor, controlling one or more of the plurality of the off-camera processing operations based on the metadata.

19. The method of claim 17, further comprising: (i) wirelessly transmitting metadata from the digital camera to the off-camera image signal processor; (ii) at the off-camera image signal processor, generating a control signal based on the metadata; (iii) transmitting the control signal to the digital camera; and (iv) controlling operation of the digital camera during taking of a subsequent exposure based on the control signal.

20. The method of claim 17, further comprising: (i) at the off-camera image signal processor, generating a control signal based on the image source data; (ii) transmitting the control signal to the digital camera; (iii) controlling operation of the digital camera during taking of a subsequent exposure based on the control signal.

21. The method of claim 20, wherein controlling operation of the digital camera during the taking of the subsequent exposure comprises controlling one or more of a focus setting, an exposure control setting, a white balance setting, a sensor gain setting, and a flash control setting for the subsequent exposure based on the control signal.

* * * * *